(12) United States Patent
Tone et al.

(10) Patent No.: US 12,117,559 B2
(45) Date of Patent: Oct. 15, 2024

(54) VEHICLE PERFORMANCE TESTING DEVICE, VEHICLE PERFORMANCE TESTING SYSTEM, AND VEHICLE PERFORMANCE TESTING METHOD

(71) Applicant: MITSUBISHI HEAVY INDUSTRIES MACHINERY SYSTEMS, LTD., Hyogo (JP)

(72) Inventors: Kenji Tone, Hyogo (JP); Mamoru Jo, Hyogo (JP); Shinichiro Nishimura, Hyogo (JP); Masayuki Shimizu, Hyogo (JP)

(73) Assignee: MITSUBISHI HEAVY INDUSTRIES MACHINERY SYSTEMS, LTD., Kobe (JP)

( * ) Notice: Subject to any disclaimer, the term of this patent is extended or adjusted under 35 U.S.C. 154(b) by 302 days.

(21) Appl. No.: 17/639,945

(22) PCT Filed: Aug. 27, 2020

(86) PCT No.: PCT/JP2020/032392
§ 371 (c)(1),
(2) Date: Mar. 3, 2022

(87) PCT Pub. No.: WO2021/044941
PCT Pub. Date: Mar. 11, 2021

(65) Prior Publication Data
US 2022/0326349 A1 Oct. 13, 2022

(30) Foreign Application Priority Data
Sep. 6, 2019 (JP) .................. 2019-163420

(51) Int. Cl.
*G01S 7/40* (2006.01)
*G01S 13/931* (2020.01)

(52) U.S. Cl.
CPC .............. *G01S 7/40* (2013.01); *G01S 13/931* (2013.01)

(58) Field of Classification Search
CPC ... G01M 17/0074; G01M 9/04; G01S 13/931; G01S 7/40
(Continued)

(56) References Cited

U.S. PATENT DOCUMENTS 5,574,226 A * 11/1996 Reuther ................ G01M 17/04
73/865.6
6,427,528 B1 8/2002 Yamakado et al.
2011/0153298 A1* 6/2011 Stein .................. G01M 17/0074
703/8

FOREIGN PATENT DOCUMENTS

DE 202018105162 U1 10/2018
JP 2019109728 A 7/2019
WO 0186245 A1 11/2001

OTHER PUBLICATIONS

Extended European Search Report for European Application No. 20860885.1 mailed Sep. 2, 2022; 8pp.

* cited by examiner

*Primary Examiner* — John H Le
(74) *Attorney, Agent, or Firm* — HAUPTMAN HAM, LLP

(57) ABSTRACT

The present invention enables testing with high reproducibility under various conditions. This present invention is provided with: a testing platform on which a vehicle to be tested is mounted and which is capable of changing the orientation and the direction of the vehicle to be tested; an environment reproduction mechanism for reproducing the environment around the vehicle to be tested; a running condition reproduction mechanism that moves relatively to the vehicle to be tested and reproduces the running state of (Continued)

the vehicle; and a building that covers the testing platform, the running condition reproduction mechanism, and the environment reproduction mechanism, and that sets the surroundings of the testing platform as an indoor space.

6 Claims, 9 Drawing Sheets

(58) Field of Classification Search
USPC .......................................................... 702/116
See application file for complete search history.

VEHICLE PERFORMANCE TESTING DEVICE, VEHICLE PERFORMANCE TESTING SYSTEM, AND VEHICLE PERFORMANCE TESTING METHOD

RELATED APPLICATIONS

The present application is a National Phase of International Application Number PCT/JP2020/032392 filed Aug. 27, 2020 and claims priority of Japanese Application Number 2019-163420 filed Sep. 6, 2019.

TECHNICAL FIELD

The present invention relates to a vehicle performance testing device, a vehicle performance testing system, and a vehicle performance testing method.

BACKGROUND ART

Examples of a testing device for a vehicle include a collision testing device for checking safety and a testing course for checking running performance. PTL 1 discloses an invention related to a testing system and a testing method in which a safe driver-assistance application operation test is performed while simulating the behavior of a nearby vehicle under various road surface conditions existing in an actual environment.

CITATION LIST

Patent Literature

[PTL 1] Japanese Unexamined Patent Application Publication No. 2019-109728

SUMMARY OF INVENTION

Technical Problem

In recent years, vehicles with advanced driver-assistance systems (ADAS), such as autonomous vehicles (AV), will be developed. A vehicle having a driver-assistance function detects a running state, controls the behavior of the vehicle based on the result thereof, and outputs driver-assistance information. Therefore, it is necessary to evaluate whether or not the running state has been properly detected and whether or not control adequate for the detected running state has been taken.

In the case of the testing system according to the invention described in PTL 1, a simulation, in which the behavior of a nearby vehicle under various road surface conditions existing in an actual environment is simulated, is performed. However, it is difficult to evaluate how a vehicle can detect information in a case where the vehicle actually runs. In addition, in a case of performing tests while running in an actual testing course, it is difficult to perform the tests under the same conditions at different times since there is a difference in surrounding environment. Therefore, it is difficult to perform tests under the same conditions set and perform comparison between vehicles, that is, it is difficult to make the reproducibility of the tests high.

The present invention has been made in view of such circumstances and an object thereof is to provide a vehicle performance testing device, a vehicle performance testing system, and a vehicle performance testing method with which it is possible to perform a high-reproducibility test under various conditions.

Solution to Problem

According to the present disclosure for achieving the above-described object of the present invention, there is provided a vehicle performance testing device including a testing platform on which a vehicle to be tested is mounted and at which an orientation of the vehicle to be tested and a direction in which the vehicle to be tested faces are changeable, an environment reproduction mechanism that reproduces an environment in a surrounding of the vehicle to be tested, a running condition reproduction mechanism that moves relative to the vehicle to be tested and reproduces a running state of the vehicle to be tested, and a building that covers the testing platform, the running condition reproduction mechanism, and the environment reproduction mechanism such that a surrounding of the testing platform becomes an indoor space.

According to the present disclosure for achieving the above-described object of the present invention, there is provided a vehicle performance testing system including the vehicle performance testing device as described above, an operation information acquisition device that acquires operation information of the vehicle that is mounted on the testing platform, and a control device that controls behavior of each unit based on a result of acquisition performed by the operation information acquisition device, in which an environment around the vehicle and behavior of the vehicle at a next timing are output as a test result based on the operation information.

According to the present disclosure for achieving the above-described object of the present invention, there is provided a vehicle performance testing method including a step of adjusting an environment in a surrounding of a testing platform, a step of controlling an orientation of the testing platform and adjusting an orientation of a vehicle to be tested that is mounted on the testing platform, a step of adjusting a relative position of an object in a surrounding of the vehicle to be tested and adjusting a running state of the vehicle to be tested, a step of acquiring operation information which is a result of recognition and determination performed by the vehicle to be tested, and a step of detecting a state of the vehicle to be tested after an elapse of a predetermined time from a time point of acquisition of the operation information.

Advantageous Effects of Invention

According to the present invention, since it is possible to reproduce a situation in the surrounding of a vehicle while reproducing an environment in a building, it is possible to perform a high-reproducibility test under various conditions.

DESCRIPTION OF EMBODIMENTS

Hereinafter, an embodiment of the present disclosure will be described in detail with reference to the drawings. Note that description in the embodiment is an example of the present invention and the present invention is not limited thereto.

Figure 1:
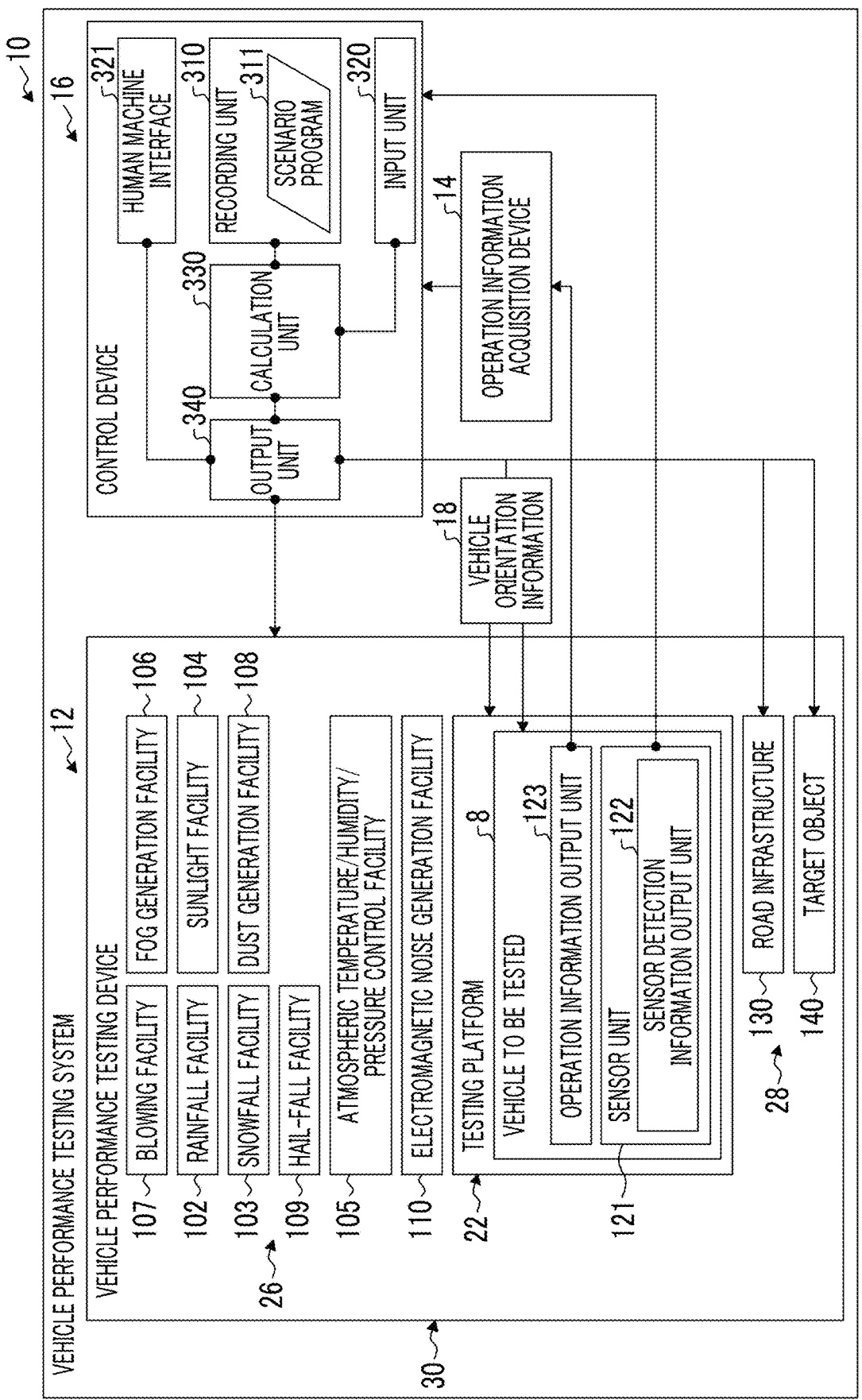
FIG. 1 is a block diagram showing a schematic configuration of a vehicle performance testing system including a vehicle performance testing device of the present embodiment.

FIG. 1 is a block diagram showing a schematic configuration of a vehicle performance testing system 10 including a vehicle performance testing device 12 of the present embodiment. The vehicle performance testing system 10 shown in FIG. 1 reproduces the running state of a vehicle 8 to be tested and performs a test for the vehicle 8 to be tested. The vehicle performance testing device 12, an operation information acquisition device 14, and a control device 16 are provided.

Figure 2:
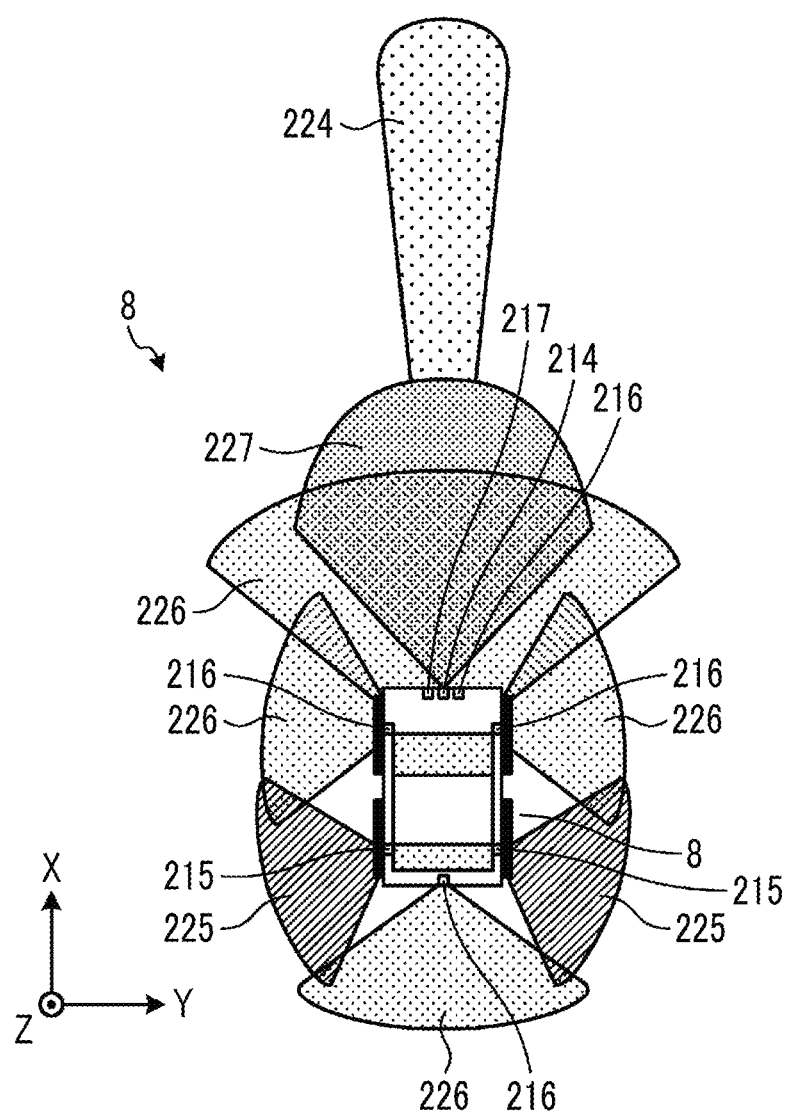
FIG. 2 is a description view for describing sensors of a vehicle to be tested.
Figure 3:
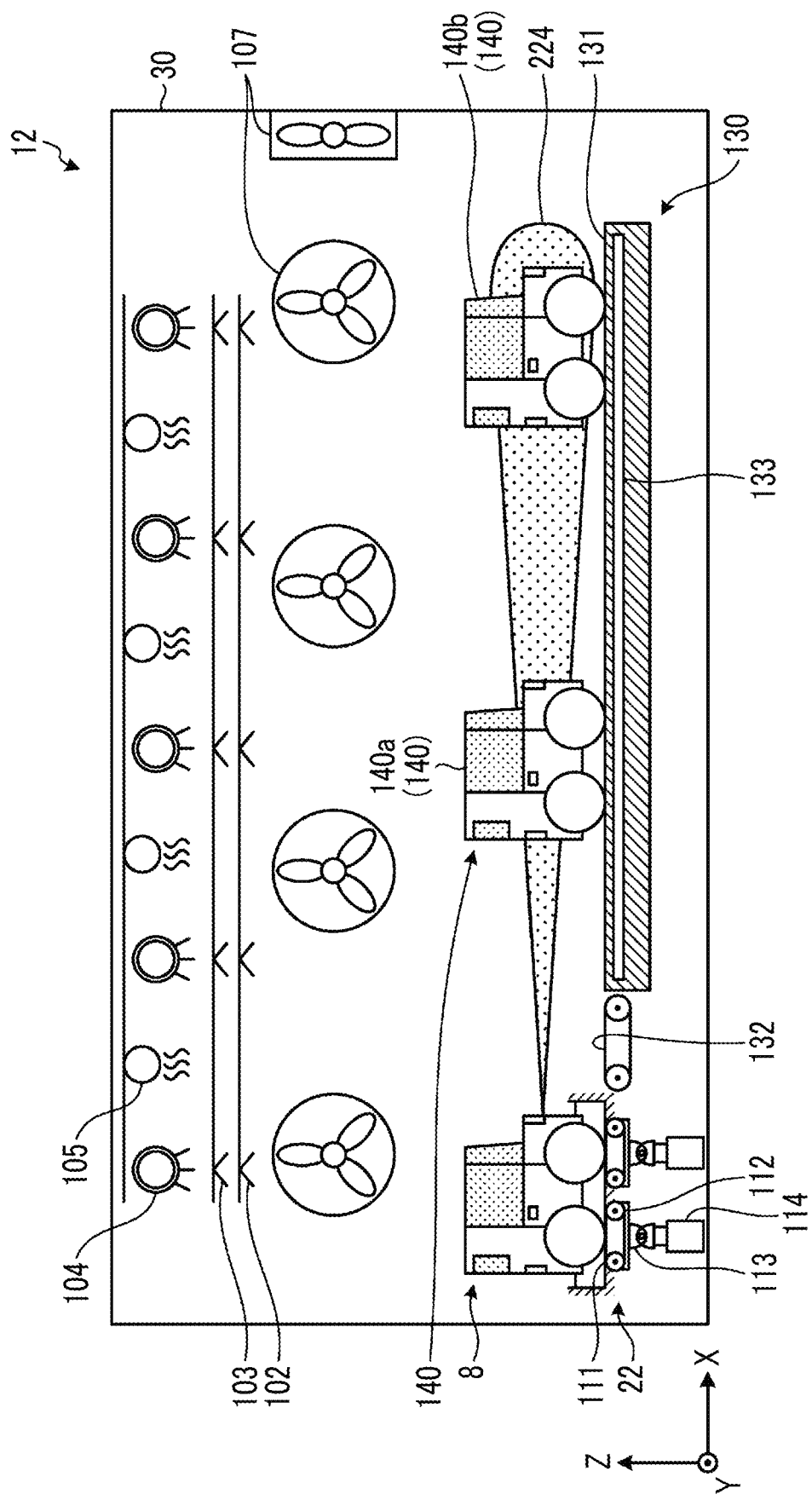
FIG. 3 is a front view showing a schematic configuration of a vehicle performance testing device.
Figure 4:
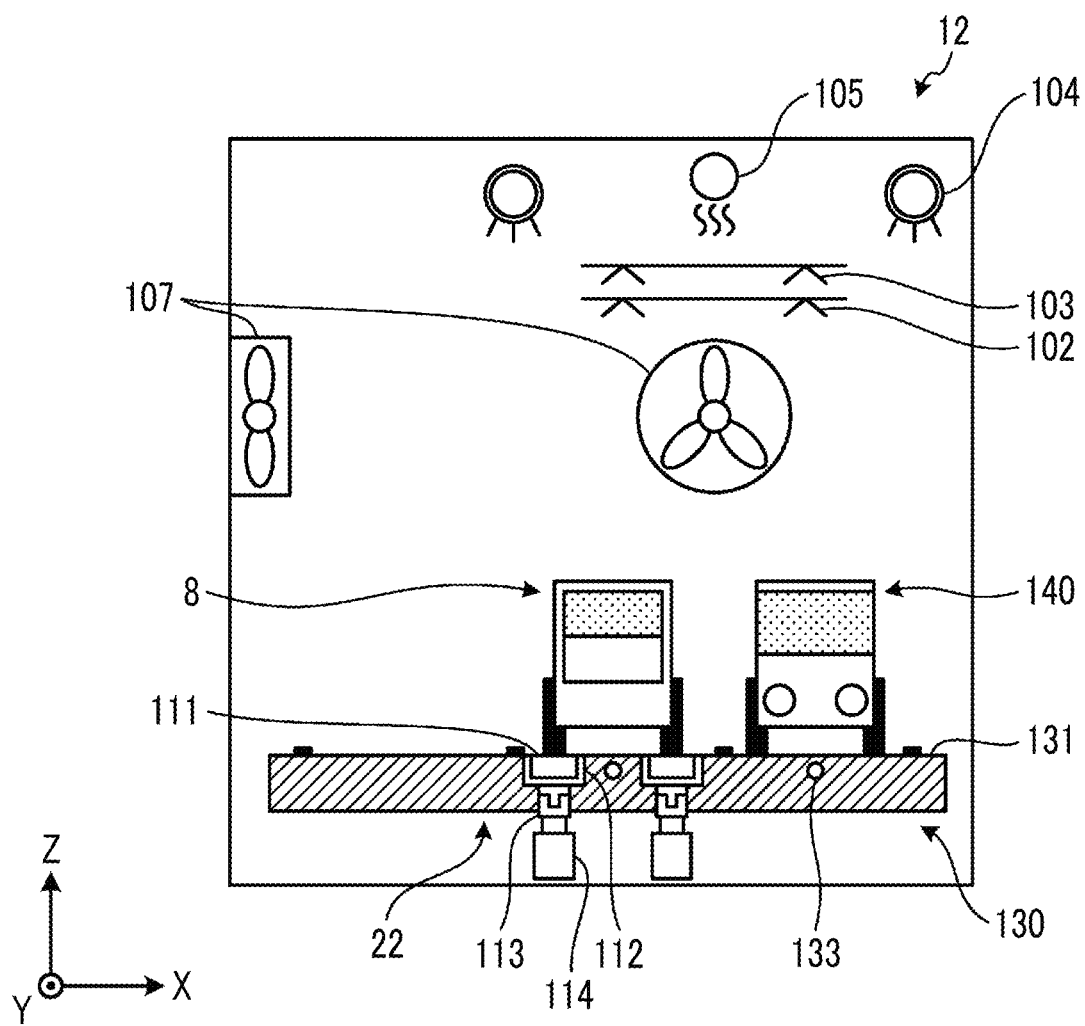
FIG. 4 is a side view showing the schematic configuration of the vehicle performance testing device.
Figure 5:
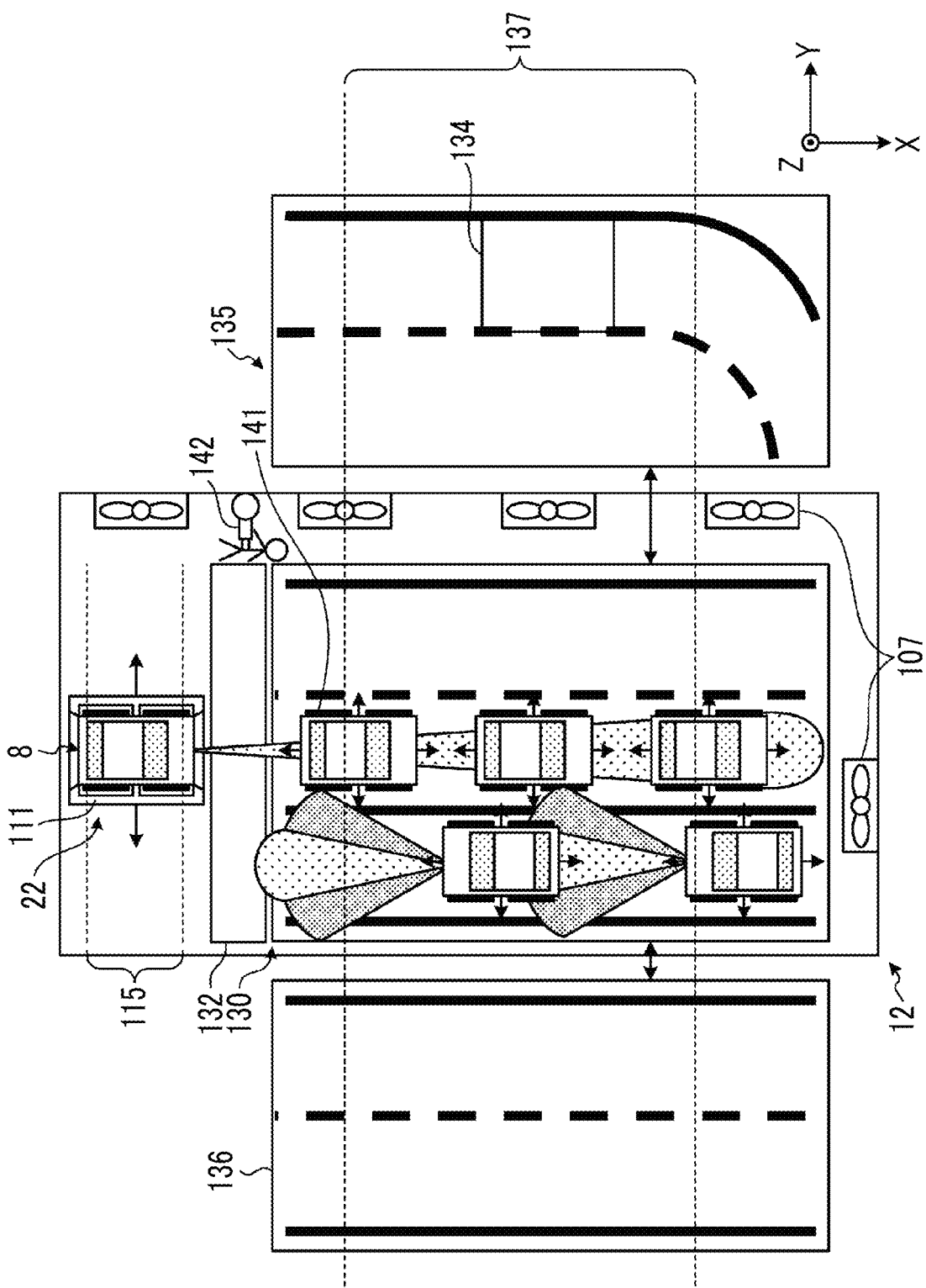
FIG. 5 is a plan view showing the schematic configuration of the vehicle performance testing device.

The vehicle performance testing device 12 of the present embodiment will be described with reference to FIGS. 2 to 5 in addition to FIG. 1. FIG. 2 is a description view for describing sensors of a vehicle to be tested. FIG. 3 is a front view showing a schematic configuration of a vehicle performance testing device. FIG. 4 is a side view showing the schematic configuration of the vehicle performance testing device. FIG. 5 is a plan view showing the schematic configuration of the vehicle performance testing device.

The vehicle performance testing device 12 reproduces an environment in the surrounding of the vehicle 8 to be tested and the driving state thereof and acquires a vehicle operation information of the vehicle 8 to be tested. The vehicle performance testing device 12 includes a testing platform 22, an environment reproduction mechanism 26, a running condition reproduction mechanism 28, and a building 30.

The vehicle 8 to be tested is a vehicle to be tested in the vehicle performance testing system 10 and the vehicle performance testing device 12. The vehicle 8 to be tested is not particularly limited and has basically an autonomous driving function, a driver-assistance function, and the like. Specifically, the vehicle 8 to be tested includes at least one sensor that detects an environment around the vehicle 8 to be tested and performs autonomous driving or driver-assistance based on the result of detection performed by the sensor. The vehicle 8 to be tested includes a sensor unit 121 and an operation information output unit 123. The vehicle 8 to be tested has various functions necessary for running in addition to the above-described configuration. As a test body, the vehicle 8 to be tested may have a structure in which only a vehicle body and a necessary sensor are provided.

The sensor unit 121 is a sensor that acquires information about the surrounding of a host vehicle. As the sensor unit 121, various sensors detecting nearby objects and situations like a camera, a millimeter-wave radar, an infrared sensor, and a light detection and ranging (or laser imaging detection and ranging (LiDAR)) can be used. Regarding the vehicle 8 to be tested shown in FIG. 5, a millimeter-wave radar 214, a camera 216, and a LiDAR 217 are provided at a front side of the vehicle, millimeter-wave radars 215 are provided at lateral sides of the vehicle, and cameras 216 are provided at the lateral sides and a rear side of the vehicle. The millimeter-wave radar 214 is a sensor that can detect a distant object (for example, a 76-78 GHz millimeter-wave radar) and acquires information about a measurement range 224. The millimeter-wave radars 215 are sensors that detect an object in ranges narrower than that of the millimeter-wave radar 214 (for example, a 24 GHz millimeter-wave radar) and acquire information about measurement ranges 225. The cameras 216 acquire images of imaging ranges 226. The LiDAR 217 acquires information about a measurement range 227. The sensor unit 121 outputs acquired information from a sensor detection information output unit 122.

The operation information output unit 123 outputs operation information determined by the vehicle 8 to be tested. Here, the operation information includes information about the results of operations performed on a steering wheel, an accelerator, a brake, and a shifter.

The testing platform 22 is disposed on one end side of the vehicle performance testing device 12 in a longitudinal direction, is disposed at a central portion of the vehicle performance testing device 12 in a lateral direction, and is configured to be movable in the lateral direction by means of a movement mechanism 115. The testing platform 22 is a palette on which the vehicle 8 to be tested is installed. The testing platform 22 changes the orientation of a stage surface 111 on which the vehicle 8 to be tested is installed. The testing platform 22 includes four roller belts 112 disposed at the center of the stage surface 111 and each roller belt 112 includes a turnable pivot 113 and an actuator 114 capable of expanding and contracting the pivot 113. The testing platform 22 lifts, lowers, and tilts the stage surface 111 by means of expansion and contraction of each actuator 114 to change the orientation of the stage surface 111. The testing platform 22 may further have a table mechanism that rotates the stage surface 111. Note that in the present embodiment, it is possible to perform a test in which the tires of the vehicle 8 to be tested are rotated since the roller belts 112 are provided. Regarding the testing platform 22, the stage surface 111 may be a plate-shaped member in a case where the vehicle 8 to be tested is not to be caused to run.

The testing platform 22 changes the orientation of the vehicle 8 to be tested by lifting, lowering, tilting, and turning the stage surface 111 so as to reproduce an orientation with respect to a road surface at the time of turning right or left, cornering, climbing a slope, descending a slope, starting movement, or stopping movement.

The environment reproduction mechanism 26 adjusts an environment inside the building 30 to change an environment in the surrounding of the vehicle 8 to be tested (that is, an environment in a range where detection is performed by the sensors) to an environment corresponding to testing conditions. The environment reproduction mechanism 26 includes a rainfall facility 102, a snowfall facility 103, a sunlight facility 104, an atmospheric temperature/humidity/pressure control facility 105, a fog generation facility 106, a blowing facility 107, a dust generation facility 108, a hail-fall facility 109, and an electromagnetic noise generation facility 110. The rainfall facility 102 drops a predetermined amount of water in the form of water droplets in a testing region to reproduce rain. The snowfall facility 103 produces snow and drops the produced snow in the testing region to reproduce snowfall. The sunlight facility 104 illuminates the testing region to reproduce a daytime environment. The sunlight facility 104 may irradiate a vehicle to be tested with light at a predetermined illuminance to reproduce the sun. The atmospheric temperature/humidity/pressure control facility 105 is an air conditioner having a heating function, a cooling function, a humidifying function, and a dehumidifying function, and changes the temperature and the humidity of a testing space to a temperature and a humidity corresponding to testing conditions. Furthermore, the atmospheric temperature/humidity/pressure control facility 105 includes a pump and increases or decreases a pressure to a pressure corresponding to the testing conditions. The fog generation facility 106 ejects mist-like water to reproduce fog in the testing region. The blowing facility 107 includes a blower that can control the direction of wind and the velocity of wind and the blowing facility 107 controls the blower to change the direction of wind and the velocity of wind in the testing region to the direction of wind and the velocity of wind corresponding to a testing upper limit. The dust generation facility 108 generates dust in the testing region. The hail-fall facility 109 produces ice and drops the produced ice in the testing region to reproduce hail. The electromagnetic noise generation facility 110 generates an electromagnetic noise in the surrounding of the testing region. As a result, it is possible to create a testing environment in which a component that hinders the detection performed by the sensors is generated. The environment reproduction mechanism 26 can adjust the inside of the building 30 to correspond to the testing conditions by controlling each unit based on the testing conditions.

The running condition reproduction mechanism 28 reproduces a running state in a region where the sensors of the vehicle 8 to be tested, which is installed on the testing platform 22, perform detection. Specifically, the running condition reproduction mechanism 28 moves a target object that moves relatively in a case where a condition that the vehicle 8 to be tested runs is set. The running condition reproduction mechanism 28 includes a road infrastructure 130 and target objects 140.

The road infrastructure 130 includes road surfaces 131, 135, and 136. In the present embodiment, the road surface 131 is a road surface that is a reproduction of a three-lane road. The road surface 135 is a road surface with a curve. The road surface 136 is a spare road surface having the same shape as the road surface 131. The road infrastructure 130 includes a rail and the road surfaces 131, 135, and 136 are configured to be movable on a rail 137. The road infrastructure 130 also includes a mechanism that moves a road surface used for a test to a position facing the testing platform 22. In addition, the road infrastructure 130 may be provided with various road surfaces for a test such as a road surface that is a reproduction of a sandy place and an unpaved road surface. The road infrastructure 130 has a temperature adjustment function 133 inside the road surface 131 and can achieve a state where the road surface 131 is frozen or a state where the road surface is heated. In addition, the road infrastructure 130 may also include, for example, a traffic signal, a pedestrian crossing, a sign, a guardrail, and a building in accordance with the purpose of a test. Note that the traffic signal, the pedestrian crossing, the sign, the guardrail, and the building may be the target object 140 which will be described later.

The target objects 140 are various kinds of objects that move relative to the vehicle 8 to be tested. The target objects 140 include a nearby vehicle 141 and a human-shaped model 142. The target objects 140 are movable with respect to the road infrastructure 130. The target objects 140 are disposed on the road infrastructure 130 and are moved on the road surfaces based on testing conditions. The target objects 140 may be moved by remote control or may be manually or automatically moved based on a testing state.

The building 30 is a structure in which the testing platform 22, the environment reproduction mechanism 26, and the running condition reproduction mechanism 28 are disposed. In the building 30, an environment in the surrounding of the vehicle 8 to be tested mounted on the testing platform 22 is set as an indoor environment and a closed space is provided. Regarding the building 30, a space for the road infrastructure is preferably wider than detection ranges of the sensors of the vehicle. The testing region in the building 30 preferably has a length of 80 m or more in a longitudinal direction and a length of 15 m or more in a lateral direction. A structure in which the sensor unit 121 of the vehicle 8 to be tested does not detect a wall surface of the testing region of the building 30 as a wall surface is preferable. Specifically, a structure in which wavelengths for detection performed by a sensor 214, sensors 215, and a sensor 217 are absorbed is preferable. In addition, an image may be displayed on the wall surface of the testing region of the building 30 so that the cameras 216 do not recognize the wall surface as a wall surface.

The vehicle performance testing device 12 can acquire the operation information determined and operated by the vehicle 8 to be tested under a predetermined reproduced environment.

Referring again to FIG. 1, the vehicle performance testing system 10 will be described. The operation information acquisition device 14 communicates with the vehicle 8 to be tested and acquires operation information determined by the vehicle. The operation information acquisition device 14 outputs the acquired operation information to the control device 16. The operation information acquisition device 14 may be separated from or integrated with the vehicle performance testing device 12 and may be integrated with or separated from the vehicle 8 to be tested.

The control device 16 includes a recording unit 310, an input unit 320, a calculation unit 330, and an output unit 340. The recording unit 310 stores various kinds of data and a scenario program 311 is recorded therein. In the scenario program 311, vehicle running conditions, testing conditions to be reproduced by the environment reproduction mechanism 26, and information about transitions of an object in the surrounding of the vehicle running, which are to be reproduced by the running condition reproduction mechanism 28, are stored corresponding to a time axis.

The input unit 320 is a mouse, a keyboard, and a touch panel, and an operator inputs various items of information. A human machine interface 321 is an operation device and an emergency stoppage button for each environment testing facility and operates and stops the environment testing facilities. The calculation unit 330 calculates adjustment conditions such as the amount of movement of a testing platform 410, a road infrastructure 430, and a target object 440 based on the result of the scenario program 311 or the operation information acquisition device 14. In addition, the calculation unit 330 outputs vehicle orientation information 18, which is the orientation of the vehicle, to the vehicle 8 to be tested. Here, the vehicle orientation information 18 includes the orientation and the acceleration with respect to six axes of the vehicle 8 to be tested and includes information necessary for vehicle control such as ABS, TCS, and ESC. The control device 16 outputs the amount of movement or the like calculated by the calculation unit 330 to the output unit 340. The output unit 340 outputs the results of various calculations to the testing platform 22, the environment reproduction mechanism 26, the running condition reproduction mechanism 28, and the vehicle 8 to be tested.

Figure 6:
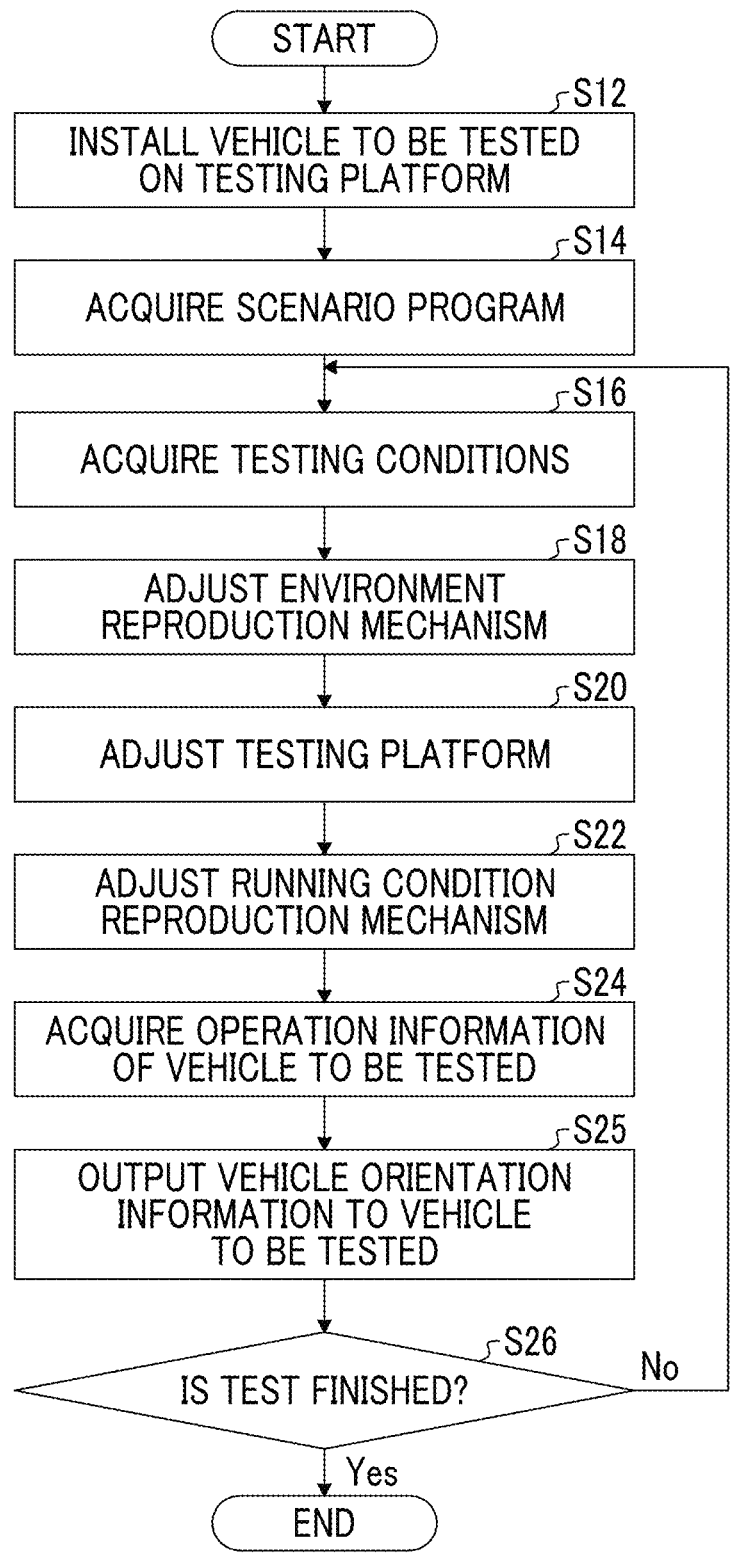
FIG. 6 is a flowchart showing an example of a vehicle performance testing method.
Figure 7:
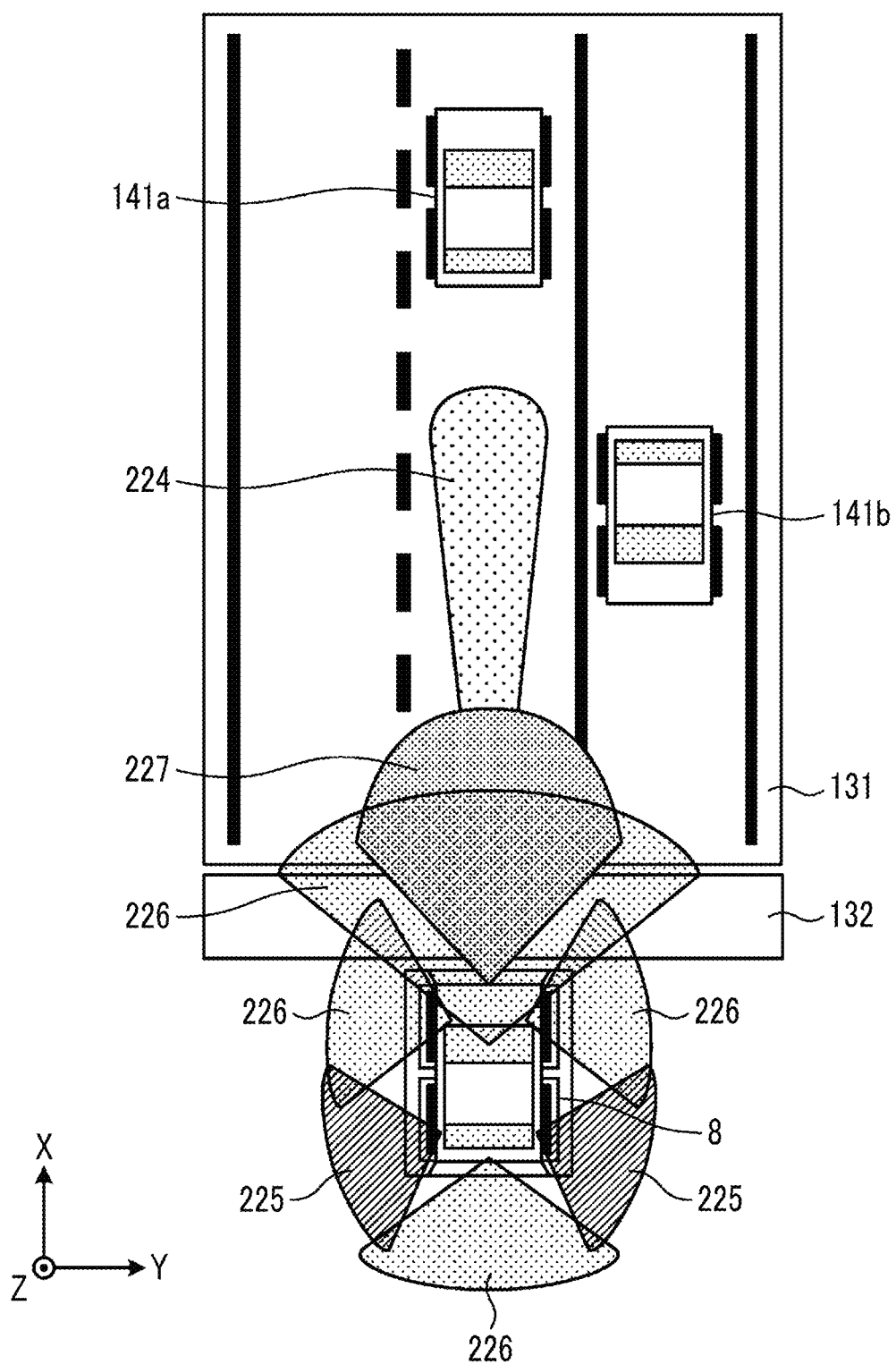
FIG. 7 is a description view for describing the vehicle performance testing method.
Figure 8:
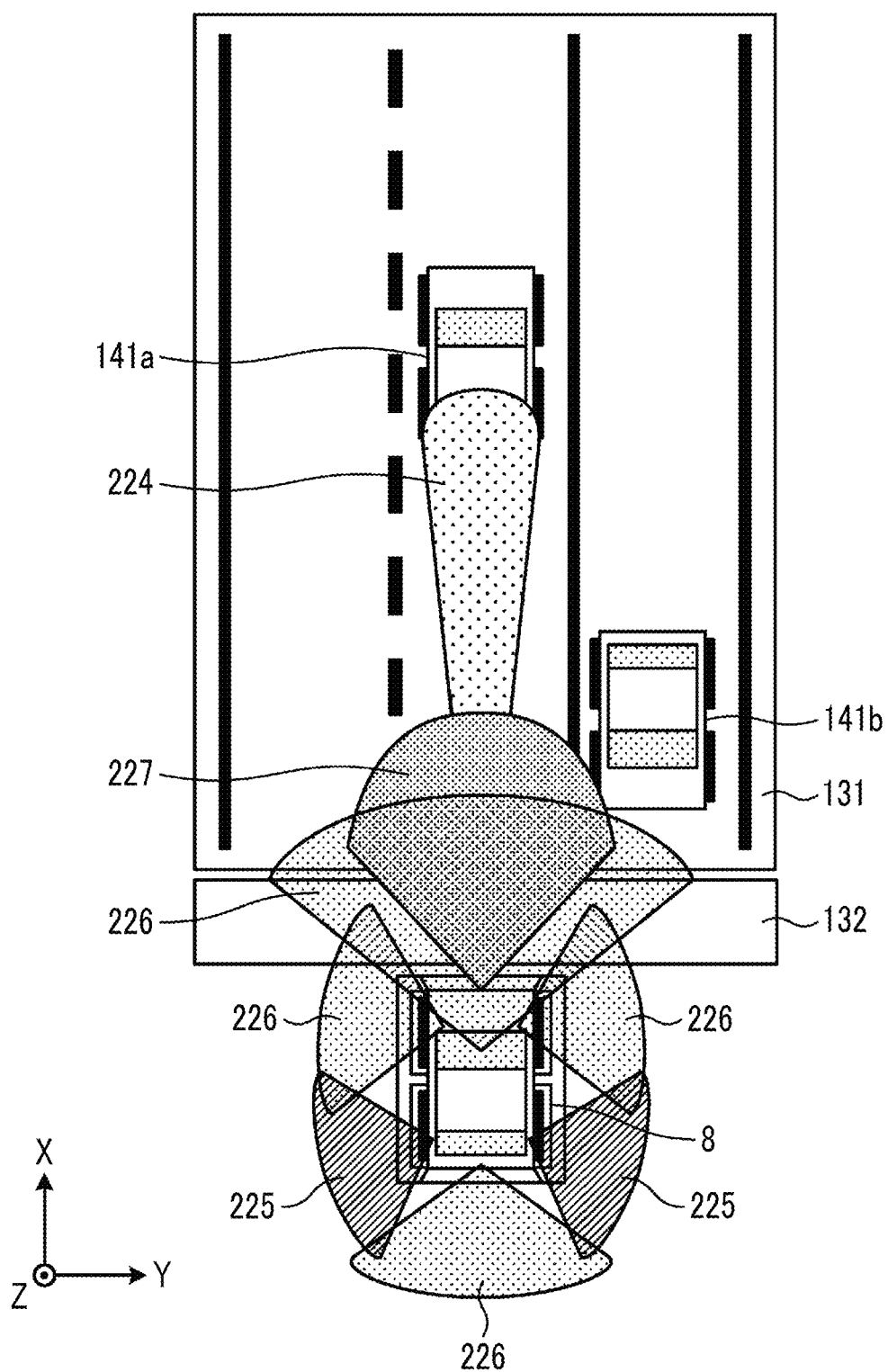
FIG. 8 is a description view for describing the vehicle performance testing method.
Figure 9:
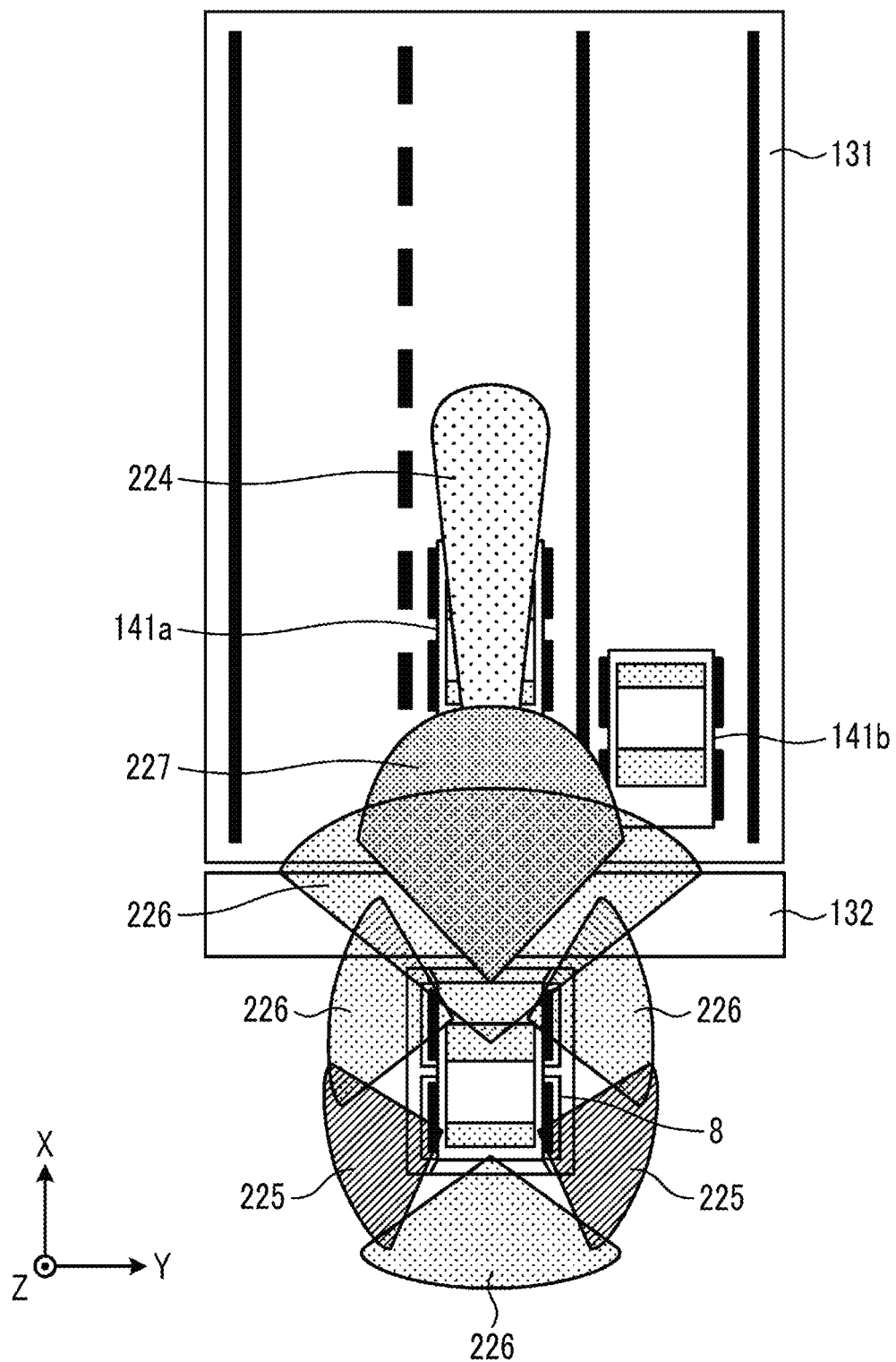
FIG. 9 is a description view for describing the vehicle performance testing method.

Next, a vehicle performance testing method in which the vehicle performance testing system 10 of the present embodiment is used will be described with reference to FIGS. 6 to 9. FIG. 6 is a flowchart showing an example of the vehicle performance testing method. Each of FIGS. 7 to 9 is a description view for describing the vehicle performance testing method. Processing shown in FIG. 6 may be automatically performed based on settings and may be performed by detecting operations input on various equipment by an operator.

The vehicle performance testing system 10 installs the vehicle 8 to be tested on the testing platform 22 (step S12). The vehicle performance testing system 10 acquires a scenario program (step S14). Time-series conditions for a test to be performed with respect to the vehicle 8 to be tested are acquired.

The vehicle performance testing system 10 acquires testing conditions (step S16). The vehicle performance testing system 10 acquires various testing conditions of a reproduction target time point. The vehicle performance testing system 10 adjusts the environment reproduction mechanism 26 (step S18). That is, a temperature, a humidity, weather, and the like are set corresponding to the testing conditions of the target time point. The vehicle performance testing system 10 adjusts the testing platform 22 (step S20). That is, the orientation of the vehicle 8 to be tested is set corresponding to the testing conditions of the target time point. The vehicle performance testing system 10 adjusts the running condition reproduction mechanism 28 (step S22). That is, the positions of the target objects 140 disposed in the surrounding of the vehicle 8 to be tested are set to positions corresponding to the testing conditions of the target time point. Note that the processing in step S18 to step S22 may be performed in parallel and may be performed in a different order. The vehicle performance testing system 10 notifies the vehicle 8 to be tested that conditions and scenario conditions related to the testing platform 22, the environment reproduction mechanism 26, and the running condition reproduction mechanism 28 are set.

Next, the vehicle performance testing system 10 acquires operation information which is the result of recognition and determination performed by the vehicle 8 to be tested under the testing conditions (step S24).

The vehicle performance testing system 10 calculates a next testing state based on the acquired operation information, outputs the conditions and scenario conditions related to the testing platform 22, the environment reproduction mechanism 26, and the running condition reproduction mechanism 28, and outputs the vehicle orientation information 18 to the testing platform 22 and the vehicle 8 to be tested (step 25).

Next, the vehicle performance testing system 10 determines whether or not the test is finished (step S26). In a case where the vehicle performance testing system 10 determines that the test is not finished (No in step S26), the vehicle performance testing system 10 returns to step S16, reproduces testing conditions of a next time point, and acquires operation information of the vehicle 8 to be tested. In a case where the vehicle performance testing system 10 determines that the test is finished (Yes in step S26), the processing is terminated.

A testing method for the vehicle to be tested will be specifically described with reference to FIGS. 7, 8, and 9. FIGS. 7, 8, and 9 show a positional relationship between the measurement ranges 224, 225, and 227 and the imaging ranges 226 of the sensor unit 121 of the vehicle 8 to be tested, a target object 141*a*, and a target object 141*b* and are plan views showing, in a superimposed manner, sensor detection information and position recording information consecutively output each time a short time elapses.

At a first time point, as shown in FIG. 7, the target object 141*a* and the target object 141*b* are not in the measurement range 224 of the sensor unit 121 of the vehicle 8 to be tested. The vehicle 8 to be tested outputs information to maintain operations currently performed (maintain operations on both of a steering wheel and an accelerator). The vehicle performance testing system 10 acquires an operation amount, calculates a next testing state, outputs the conditions and scenario conditions related to the testing platform 22, the environment reproduction mechanism 26, and the running condition reproduction mechanism 28, and outputs the vehicle orientation information 18 to the testing platform 22 and the vehicle 8 to be tested.

Regarding the vehicle performance testing system 10, at a second time point after a lapse of a predetermined time from the first time point, the target object 141*a* is in the detection range 224 of the sensor unit 121 of the vehicle 8 to be tested and the target object 141*b* is in the detection range 227 of the sensor unit 121 of the vehicle 8 to be tested as shown in FIG. 8. In this state, the vehicle performance testing system 10 acquires the result of detection performed by the sensors as the result of detection performed at the second time point.

Regarding the vehicle performance testing system 10, at a third time point after a lapse of a predetermined time from the second time point, the target object 141*a* is in the measurement range 224 of the sensor unit 121 of the vehicle 8 to be tested and the target object 141*b* is in the imaging range 226 of the sensor unit 121 of the vehicle 8 to be tested as shown in FIG. 9. In this state, the vehicle 8 to be tested outputs operation information, which is the result of recognition of the target object 141*a* and the target object 141*b* and determination, to the vehicle performance testing system 10. The vehicle performance testing system 10 acquires the operation information, calculates a next testing state, outputs the conditions and scenario conditions related to the testing platform 22, the environment reproduction mechanism 26, and the running condition reproduction mechanism 28, and outputs the vehicle orientation information 18 to the testing platform 22 and the vehicle 8 to be tested.

As described above, the vehicle performance testing system 10 can reproduce testing conditions of each time point by adjusting a surrounding environment inside the building 30 and adjusting the position of a target object in the surrounding of the vehicle 8 to be tested, calculate a testing state of a next time point by acquiring operation information of the vehicle 8 to be tested in a state as reproduced, and reproduce an environment in the surrounding of the vehicle 8 to be tested by operating each device.

In addition, it is possible to remove the influence of weather outside the building 30 and an environment by reproducing testing conditions inside the building 30 as in the present embodiment and to perform a high-reproducibility test. Accordingly, it is possible to preferably perform comparative investigation. In addition, a test for an extreme environment can be performed with a high reproducibility.

In addition, in the present embodiment, testing conditions for each timing corresponding to a predetermined time are reproduced based on a scenario program, operation information of the vehicle 8 to be tested is acquired in a state where the testing conditions are reproduced, and a different time point is reproduced when the acquisition is finished.

Accordingly, it is not necessary to cause the vehicle to be tested to run actually, and thus it is possible to perform a test in a limited space. Here, examples of the predetermined time include several tens of msec to 12 msec. The predetermined time may be determined based on the rate of recognition, determination, and operation of the vehicle to be tested.

In addition, as in the present embodiment, since the vehicle 8 to be tested is installed on the testing platform 22 and the running condition reproduction mechanism 28 moves a target object in the surrounding of the vehicle 8 to be tested relative to the vehicle 8 to be tested (that is, the running condition reproduction mechanism 28 moves a target object moving relative to the vehicle 8 to be tested), it is possible to reduce the size of a testing environment. Here, the target object is the target object 140 and is a nearby vehicle other than the vehicle to be tested which is a target to be tested, a model, and other objects that are generally recognized when the vehicle runs on a road.

The environment reproduction mechanism 26 reproduces at least one of the amount of rainfall, the amount of snowfall, and fog, and thus it is possible to perform a test under various running conditions.

In the above-described embodiment, the running condition reproduction mechanism 28 may consecutively reproduce running conditions and consecutively acquire data when detection is performed by the sensors after testing conditions are reproduced each time a predetermined time elapses.

In addition, the vehicle performance testing system 10 can determine whether or not autonomous driving or driver-assistance has effectively worked under a condition under which an accident has occurred by reproducing the condition under which the accident has occurred as a scenario program. In addition, the vehicle performance testing system 10 can check how autonomous driving or driver-assistance works under testing conditions by supplying acquired sensor information to a program for autonomous driving or driver-assistance. In addition, as described above, the vehicle performance testing system 10 may determine testing conditions of a next time point by processing sensor information detected under testing conditions by means of a program for autonomous driving and driver-assistance.

REFERENCE SIGNS LIST

8: vehicle to be tested
10: vehicle performance testing system
12: vehicle performance testing device
14: operation information acquisition device
16: control device
18: vehicle orientation information
22: testing platform
26: environment reproduction mechanism
28: running condition reproduction mechanism
30: building
102: rainfall facility
103: snowfall facility
104: sunlight facility
105: atmospheric temperature/humidity/pressure control facility
106: fog generation facility
107: blowing facility
108: dust generation facility
109: hail-fall facility
110: electromagnetic noise generation facility
111: stage surface
112: roller belt
113: pivot
114: actuator
115: movement mechanism
121: sensor unit
122: sensor detection information output unit
123: operation information output unit
130: road infrastructure
131: road surface
132: movable road surface
133: temperature adjustment function
134: stepped road surface
135: step
136: spare road surface
137: rail
140: target object
141, 141a, 141b: nearby vehicle
142: human-shaped model
214: millimeter-wave radar
215: millimeter-wave radar
216: camera
217: LiDAR
224: millimeter-wave radar measurement range
225: millimeter-wave radar measurement range
226: camera imaging range
227: LiDAR measurement range

The invention claimed is:

1. A vehicle performance testing system for a driver-assistance function of a vehicle, the system comprising:
   a testing platform on which the vehicle to be tested is mounted and at which an orientation of the vehicle to be tested and a direction in which the vehicle to be tested faces are changeable;
   an environment reproduction mechanism that reproduces an environment in a surrounding of the vehicle to be tested;
   a running condition reproduction mechanism that moves relative to the vehicle to be tested and reproduces a running state of the vehicle to be tested; and
   a building that covers the testing platform, the running condition reproduction mechanism, and the environment reproduction mechanism such that a surrounding of the testing platform becomes an indoor space;
   an operation information acquisition device that acquires operation information of the vehicle to be tested that is mounted on the testing platform; and
   a recording unit that stores a scenario program, which is time-series conditions for a test to be performed with respect to the vehicle to be tested; and
   a control device that controls behavior of each unit based on a result of acquisition performed by the operation information acquisition device,
   wherein the control device:
      controls behavior of a target object and the environment reproduction mechanism based on the scenario program determined in advance,
      acquires first testing conditions from the scenario program,
      acquires first operation information which is a result of recognition and determination performed by the vehicle to be tested under the first testing conditions,
      determines, based on the first operation information, an orientation of the vehicle to be tested, a running state to be reproduced by the running condition reproduction mechanism, and conditions of the environment reproduction mechanism,
      reproduces second testing conditions after an elapse of a predetermined time from the first testing conditions based on the determined orientation, the determined running state and the determined conditions, and outputs, as a test result, a second orientation information, which is an environment around the vehicle to be tested and behavior of the vehicle to be tested, at the second testing conditions, and the control device repeats processing of reproducing the second testing conditions based on the first operation information.

2. The vehicle performance testing system according to claim 1, wherein the running condition reproduction mechanism moves a target object moving relative to the vehicle to be tested.

3. The vehicle performance testing system according to claim 1, wherein the running condition reproduction mechanism includes a vehicle that moves relative to the testing platform and a movement mechanism that is installed in a vicinity of a running road surface and moves a structure relative to the testing platform.

4. The vehicle performance testing system according to claim 1, wherein the environment reproduction mechanism reproduces at least one of an amount of rainfall, an amount of snowfall, and fog.

5. A vehicle performance testing method comprising:

a first step of adjusting an environment in a surrounding of a testing platform to first testing conditions of a reproduction target time point;

a second step of controlling an orientation of the testing platform and adjusting an orientation of a vehicle to be tested that is mounted on the testing platform to the first testing conditions;

a third step of adjusting a relative position of an object in a surrounding of the vehicle to be tested to the first testing conditions;

a fourth step of notifying the vehicle to be tested that the first testing conditions are set;

a fifth step of acquiring first operation information which is a result of recognition and determination performed by the vehicle to be tested under the first testing conditions; and a sixth step of outputting second testing conditions of a next reproduction testing time point after an elapse of a predetermined time from the reproduction target time point based on the first operation information, wherein the method includes reproducing the second testing conditions in place of the first testing conditions, repeating the first to sixth steps, and detecting a state of the vehicle to be tested under the second testing conditions as a second operation information.

6. The vehicle performance testing method according to claim 5, wherein the vehicle to be tested has an autonomous driving function, the state of the vehicle to be tested at the next reproduction target time point is a state of being driven based on an operation performed by the autonomous driving function based on the first operation information, and a running state of the vehicle to be tested is adjusted by moving an environment in the surrounding of the vehicle to be tested.

* * * * *